United States Patent
Incavo et al.

(10) Patent No.: US 8,156,979 B2
(45) Date of Patent: Apr. 17, 2012

(54) TIRE WITH ZONED BUILT-IN SEALANT LAYER

(76) Inventors: Joseph Alan Incavo, Hudson, OH (US); Thomas Roy Fuhrig, North Canton, OH (US); Warren James Busch, North Canton, OH (US); Patrick David Marks, Uniontown, OH (US)

( * ) Notice: Subject to any disclaimer, the term of this patent is extended or adjusted under 35 U.S.C. 154(b) by 703 days.

(21) Appl. No.: 11/942,117

(22) Filed: Nov. 19, 2007

(65) Prior Publication Data
US 2009/0126842 A1    May 21, 2009

(51) Int. Cl.
*B29C 73/16*    (2006.01)
*B60C 19/12*    (2006.01)

(52) U.S. Cl. ........ 152/505; 152/502; 152/503; 156/115; 523/166

(58) Field of Classification Search .................. 156/123, 156/97, 110.1, 115; 152/502, 503, 504, 505, 152/506, 507, 510, 521; 523/166; 106/33
See application file for complete search history.

(56) References Cited

U.S. PATENT DOCUMENTS

| | | | |
|---|---|---|---|
| 1,239,291 A | 9/1917 | Morse | |
| 2,877,819 A | 3/1959 | Gibbs | |
| 3,045,509 A | 8/1962 | Sweet et al. | 154/43.5 |
| 3,563,294 A | 2/1971 | Chien | 152/346 |
| 4,082,703 A | 4/1978 | Duffy et al. | 260/2.5 |
| 4,140,167 A | 2/1979 | Bohm et al. | 152/346 |
| 4,171,237 A * | 10/1979 | Bohm et al. | 156/115 |
| 4,206,796 A | 6/1980 | Chemizard | 152/347 |
| 4,228,839 A | 10/1980 | Bohm et al. | 152/347 |
| 4,248,922 A * | 2/1981 | Shortway et al. | 428/159 |
| 4,286,643 A | 9/1981 | Chemizard et al. | 152/347 |
| 4,359,078 A | 11/1982 | Egan | 152/347 |
| 4,444,294 A | 4/1984 | Yooshigai | 188/24.11 |
| 4,664,168 A * | 5/1987 | Hong et al. | 152/504 |
| 4,895,610 A | 1/1990 | Egan | 156/115 |
| 4,919,183 A | 4/1990 | Dobson | 152/502 |
| 4,966,213 A | 10/1990 | Kawaguchi et al. | 152/504 |
| 5,085,942 A | 2/1992 | Hong et al. | 524/492 |
| 5,295,525 A * | 3/1994 | Sanda, Jr. | 152/503 |
| 6,322,811 B1 | 11/2001 | Verma et al. | 424/451 |
| 6,837,287 B2 | 1/2005 | Smith, Sr. et al. | 152/503 |
| 6,962,181 B2 | 11/2005 | Deevers et al. | 152/503 |
| 2003/0131746 A1* | 7/2003 | Smoot et al. | 101/375 |
| 2004/0140587 A1* | 7/2004 | Hadley | 264/257 |
| 2005/0205186 A1* | 9/2005 | Wall et al. | 152/504 |
| 2006/0169393 A1* | 8/2006 | Botts et al. | 156/115 |

FOREIGN PATENT DOCUMENTS

| | | |
|---|---|---|
| AU | 473985 | 5/1974 |
| EP | 1533108 | 5/2005 |
| EP | 1721932 | 11/2006 |

OTHER PUBLICATIONS

Terry Myers Kirk-Othmer Encyclopedia of Chemcial Technology Copyright 2001, John Wiley and Sons Secions 1.3, 2.5, and 2.6.*

* cited by examiner

*Primary Examiner* — Richard Crispino
*Assistant Examiner* — Martin Rogers
(74) *Attorney, Agent, or Firm* — Henry C. Young, Jr.

(57) ABSTRACT

The present invention relates to a pneumatic tire which contains a built-in zoned puncture sealant layer. The zoned puncture sealant layer is comprised of organoperoxide depolymerized butyl rubber zones comprised of a central primary zone and lateral zones joined together to form a unitary sealant layer. The sealant of the lateral zones of the sealant layer is of a higher storage modulus (G') than the sealant of the central zone.

7 Claims, 2 Drawing Sheets

TIRE WITH ZONED BUILT-IN SEALANT LAYER

FIELD OF THE INVENTION

The present invention relates to a pneumatic tire which contains a built-in zoned puncture sealant layer. The zoned puncture sealant layer is comprised of organoperoxide depolymerized butyl rubber zones comprised of a central primary zone and lateral zones joined together to form an unitary sealant layer. The primary central zone is positioned in the crown region of the tire between or beneath the lateral zones. The sealant of the lateral zones of the sealant layer is of a higher storage modulus (G') than the sealant of the central zone.

BACKGROUND OF THE INVENTION

Various pneumatic tires have been proposed which contain a built-in sealant layer based upon a depolymerized butyl rubber layer. For example, see U.S. Pat. Nos. 4,895,610, 4,228,839, 4,171,237, 4,140,167 and U.S. patent application Ser. Nos. 10/171,057, 10/368,259 and 2005/0205186.

Additional patent publications which propose various tire constructions which may involve built-in or built-on sealants for tires such as for example, U.S. Pat. Nos. 1,239,291, 2,877,819, 3,048,509, 3,563,294, 4,206,796, 4,286,643, 4,359,078, 4,444,294, 4,895,610, 4,919,183 and 4,966,213.

In practice, as the tire is run, centrifugal force can promote a small degree of flow of the built-in sealant layer located in the shoulder or sidewall regions of the tire toward the center, or crown region, of the tire, thereby reducing the puncture sealing capability of the built-in sealant layer in the shoulder region of the tire.

For this invention, it is proposed to provide a tire having a unitary built-in sealant layer divided into zones, namely an annular central zone positioned in the crown region of the tire and annular lateral zones, wherein the built-in sealant of the lateral zones are of a higher storage modulus (G') than the sealant of the central zone to thereby present a greater dimensional stability and thereby resistance to flow of the sealant in the lateral zones promoted by centrifugal force resulting by movement of the associated tire.

In one embodiment, the lateral zones of the sealant layer may be individually positioned on each axial side of the central zone.

In another embodiment, the lateral zones of the sealant layer may be individually positioned axially outward from the center of the sealant layer and on the central sealant zone and wherein the said central zone extends over the entire axial width of the sealant layer.

In practice, it is desirable for the storage modulus (G'), at a 5 percent dynamic strain at 100° C. and 1 hertz of the sealant composition of the lateral sealant zones to be least 15, alternately at least 20, kPa higher (greater) than the sealant composition of said central sealant zone.

It is to be appreciated, that in one embodiment, the zones of the built-in sealant layer for the pneumatic tires, which is derived from a depolymerization of a butyl rubber-based sealant precursor composition typically, contain a rubber reinforcing carbon black filler to render the sealant black in color or may contain precipitated silica with only a minimal amount of carbon black, if any, preferably exclusive of carbon black, together with a colorant to color the sealant layer a color other than black.

For such zoned sealant layer, organoperoxide efficiency for the in situ depolymerization of the butyl rubber is of interest.

In one aspect, by controlling the use of the organoperoxide, free radical promoted butyl rubber depolymerization activity, or rate, (referred to herein as organoperoxide activity) may be varied and the degree (extent) of depolymerization of the butyl rubber varied, depending upon the selection of organoperoxide for the individual sealant zones to thereby result in the sealant compositions of the individual sealant zones having different storage modulus (G') values.

Accordingly, on this basis, an organoperoxide for the sealant precursor of the central zone is to have a greater activity (a more active organoperoxide) than the organoperoxide of said lateral zones.

For example, where the organoperoxide for the lateral zones is comprised of dicumyl peroxide (a herein preferred organoperoxide for such purpose) for the in situ formation of the built-in sealant of the lateral zones, a more active organoperoxide (such as for example n-butyl-4,4-di(tert-butyl-peroxy) valerate) is used for the aforesaid central zone.

Therefore, by using organoperoxides of differing activities at about the same temperature, the in situ formation of the built-in sealant of the lateral zones is to have greater storage modulus (G') than the storage modulus (G') of the central zone, and, accordingly, a reduced potential tendency for a small degree of flow under conditions of centrifugal force occasioned by operation of the tire.

A further embodiment of the invention is a treatment of the precipitated silica with, for example, at least one of polyalkylene glycol (e.g. polyethylene glycol) and alkoxysilane in order to inhibit, retard and/or significantly prevent significant contact of hydroxyl groups contained on the precipitated (synthetic amorphous) silica aggregates with the organoperoxide, as well as possibly water moieties thereon.

Accordingly, in one embodiment, the precipitated silica may be treated in situ within the rubber composition prior to addition of the organoperoxide, or may be pre-treated prior to its addition to the rubber composition, with a low molecular weight polyalkylene oxide polymer, which might sometimes be referred to as a polyalkylene glycol (e.g. polyethylene glycol) and/or with an alkoxysilane.

Indeed, it is considered herein that significant challenges are presented using the precipitated silica (optionally also including the clay when used in combination with the precipitated silica), particularly when used in place of rubber reinforcing carbon black for reinforcing filler for a non-black colored sealant for the above reasons.

Therefore, as indicated above, when the precipitated silica is used, it is preferably treated with at least one of a polyalkylene oxide (e.g. polyethylene oxide) and alkoxysilane.

In a further embodiment of the invention, while the butyl rubber, as a copolymer of isobutylene and isoprene, may be composed of greater than one weight percent units derived from isoprene, it is preferred that it is composed of from only about 0.5 to 1.0 weight percent units derived from isoprene. The use of a butyl rubber with such low unsaturation content is to promote a more efficient depolymerization by treatment with the organoperoxide where it is envisioned that the presence of the double bonds within the butyl rubber may tend to terminate its depolymerization when the depolymerization process reaches the double bond unsaturation in the butyl rubber.

In an additional aspect of the invention, to promote better processing of the butyl rubber-based sealant precursor composition, it is desired to use a butyl rubber that has a relatively high Mooney viscosity (ML+8) value at 125° C. in a range of from about 25 to about 60, alternately from about 40 to about 60.

Thus a butyl rubber of very low isoprene-based unsaturation content (for more effective depolymerization of the butyl rubber) and relatively high Mooney viscosity (to promote better physical handling of the sealant precursor composition) is desired.

In practice, it is desired herein for the butyl rubber-based sealant precursor composition to have a storage modulus (G') physical property, at a 5 percent dynamic strain at 100° C. and 1 hertz in a range of about 170 to about 350 kPa, alternately in a range of from about 175 to about 300 kPa.

In the description of this invention, the term "phr" is used to designate parts by weight of an ingredient per 100 parts of elastomer unless otherwise indicated. The terms "elastomer" and "rubber" are used interchangeably unless otherwise indicated. The terms "cure" and "vulcanize" are used interchangeably unless otherwise indicated.

SUMMARY AND PRACTICE OF THE INVENTION

In accordance with this invention a zoned butyl rubber based tire sealant precursor strip is provided of a substantially rectangular configuration which is comprised of a central zone and outboard lateral zones of a configuration which comprises:

(A) said central zone positioned between said outboard lateral zones and said outboard lateral zones across the width of said sealant precursor strip wherein said outboard lateral zones are individually positioned in a spaced apart relationship to each other on each side of said central zone and at the peripheral edges of said sealant precursor strip;

wherein said central zone comprises from about 50 to about 70 percent of the width of said sealant precursor strip and said lateral zones correspondingly comprise a total of from about 30 to about 50 percent of the width of the sealant precursor strip where each of said outboard lateral zones are of substantially equal widths and each individually thereby occupy from about 15 about 25 percent of the width of the sealant precursor strip; or (B) said central zone extending throughout the length and width of the sealant precursor strip and said outboard lateral zones each individually positioned on said central zone of said sealant precursor strip in a spaced apart relationship to each other and are each spaced apart from the periphery of the sealant precursor strip;

wherein said outboard lateral zones comprise a total of from about 10 to about 20 percent of the width of the sealant precursor strip where each of the lateral zones are of substantially equal widths and each individually thereby occupy from about 5 to about 10 percent of the width of the sealant precursor strip;

wherein the compositions of said sealant precursor strip zones are comprised of:
  (1) butyl rubber,
  (2) organoperoxide;
  (3) reinforcing filler comprised of:
    (a) precipitated silica and rubber reinforcing carbon black, or
    (b) precipitated silica and colorant having a color other than black, or
    (c) precipitated silica together with a colorant having a color other than black and a minimal amount of rubber reinforcing carbon black (e.g. from about 0.5 to about 2 phr) so long as the sealant is of a non-black color, and (C) optionally clay;

wherein the organoperoxide of said central zone has a greater activity than the organoperoxide of said lateral zones.

A method of preparing a zoned butyl rubber based sealant precursor strip comprised building said zoned sealant precursor strip into a green, unvulcanized, tire assembly and curing the assembly in a suitable mold at an elevated temperature wherein the butyl rubber of the sealant precursor zones is at least partially depolymerized in situ within the sealant precursor strip in the presence of said respective organoperoxides during curing of the tire at an elevated temperature in a suitable mold to form a tire containing a zoned built-in sealant layer.

Accordingly, and in further practice of the invention, a pneumatic tire is provided which contains a built-in zoned circumferential sealant layer comprised of a central zone and outboard lateral zones which extend throughout the thickness of said sealant layer from its top to its bottom surfaces and extend throughout the circumferential length of the sealant layer in a parallel relationship to each other of a configuration which comprises:

(A) said central zone positioned between said outboard lateral zones and said outboard lateral zones across the width of said sealant layer wherein said outboard lateral zones are individually positioned in a spaced apart relationship to each other on each side of said central zone and at the peripheral edges of said sealant layer;

wherein said central zone comprises from about 50 to about 70 percent of the width of said sealant layer and said lateral zones correspondingly comprise a total of from about 30 to about 50 percent of the width of the sealant layer where each of said outboard lateral zones are of substantially equal widths and each individually thereby occupy from about 15 about 25 percent of the width of the sealant layer; or (B) said central zone extending throughout the length and width of the sealant layer and said outboard lateral zones each individually positioned on said central zone of said sealant layer in a spaced apart relationship to each other and are each spaced apart from the periphery of the sealant layer;

wherein said outboard lateral zones comprise a total of from about 10 to about 20 percent of the width of the sealant layer where each of the lateral zones are of substantially equal widths and each individually thereby occupy from about 5 to about 10 percent of the width of the sealant layer;

wherein the compositions of said sealant layer zones are comprised of an organoperoxide depolymerized (at least partially depolymerized) butyl rubber and
  (C) reinforcing filler comprised of:
    (1) precipitated silica and rubber reinforcing carbon black, or
    (2) precipitated silica and colorant having a color other than black, or
    (3) precipitated silica, a colorant having a color other than black and a minimal amount of rubber reinforcing carbon black (e.g. from about 0.5 to about 2 phr) so long as the sealant is of a non-black color, and
  (D) optionally clay (e.g. from about 1 to about 15 phr);
  (E) optionally from zero to about 20, alternately about 2 to about 15, phr of rubber processing oil, preferably a rubber processing oil having a maximum aromatic content of about 15 weight percent, and preferably a naphthenic content in a range of from about 35 to about 45 weight percent and preferably a paraffinic content in a range of about 45 to about 55 weight percent.

wherein the organoperoxide for the depolymerization of the butyl rubber of said central zone is an organoperoxide having a greater activity than the organoperoxide for the depolymerization of the butyl rubber of said lateral zones.

In practice, the organoperoxide for depolymerization of the butyl rubber of the lateral zones may preferably be, for example, dicumylperozide.

In practice, the organoperoxide for depolymerization of the butyl rubber of the central zone having a greater activity than said dicumylperoxide may be, for example, n-butyl-4,4-di (tert-butyl-peroxy) valerate.

Alternatively, the organoperoxide may be, for example, comprised of t-butyl peroxybenzoate, a,a'-bis(t-butylperoxy)-diisopropylbenzene, 2,5-dimethyl-2,5-di(t-butylperoxy)-hexane and t-butylperoxy-3,5,5-trimethyl-hexanoate as Varox™ TBPB; Varox™ VC-R; Varox™ DBPH and Varox™ 270-XL, respectively, from the R.T. Vanderbilt Company, so long as the associated storage modulus (G') is obtained.

In one embodiment, to promote better processing of the butyl rubber-based sealant precursor composition, it is desired for said butyl rubber to have a relatively high Mooney viscosity (ML+8) value at 125° C. in a range of from about 25 to about 60, alternately from about 40 to about 60. Thus the presence of a butyl rubber having a very low isoprene-based unsaturation content (for more effective depolymerization of the butyl rubber) and relatively high Mooney viscosity (to promote better physical handling of the sealant precursor composition) is desired. Representative of such butyl rubbers is, for example, Butyl 065™ and Butyl 068™, from ExxonMobil reportedly having a Mooney viscosity (125° C.) of about 32 and 51, respectively.

Alternately, in a further embodiment, it is desired for the butyl rubber to be comprised of a plurality of butyl rubbers (e.g. a combination of two butyl rubbers) as, for example, a first butyl rubber having a Mooney (ML1+4), 125° C., viscosity in a range of from about 35 to about 60 and at least one additional, or second, butyl rubber having a Mooney (ML1+ 4), 125° C., in a range of from about 25 to about 45, wherein the Mooney viscosity of said first butyl rubber is at least 10 Mooney viscosity units higher than the Mooney viscosity of said additional, or second, butyl rubber.

Representative of such butyl rubbers are, for example, Butyl 065™ and Butyl 068™, from ExxonMobil reportedly having Mooney viscosities (125° C.) of about 32 and 51, respectively.

In practice, the storage modulus (G') at of the sealant composition of the sealant composition for the central zone of said sealant layer has a storage modulus (G') physical property, at a 5 percent dynamic strain at 100° C. and 1 hertz in a range of from about 10 to about 60 kPa, alternately in a range of from about 10 to about 45 kPa and the sealant composition for the lateral sealant zones of said sealant layer has a storage modulus (G') physical property, at a 5 percent dynamic strain at 100° C. and 1 hertz in a range of from about 20 to about 60 kPa and at least 15, preferably at least 20, kPa higher (greater) than the sealant composition of said central sealant zone.

In practice, when the sealant precursor compositions contain said precipitated silica, it is preferred that the silica is pre-treated with a polyalkylene glycol such as for example a polyethylene glycol having a weight average molecular weight in a range of from about 2,000 to about 15,000, alternately from about 2,000 to about 10,000, wherein said silica is thereby pre-treated by:

(A) treating said precipitated silica with said polyethylene glycol prior to its addition to said butyl rubber based sealant precursor, or (B) treating said precipitated silica in said butyl rubber based sealant precursor prior to addition of said polyethylene glycol.

Such pre-treatment of the precipitated silica is intended to at least partially inhibit absorption of the organoperoxide (e.g. dicumyl peroxide and more active organoperoxide such as, for example, n-butyl-4,4-di(tert-butyl-peroxy) valerate) onto the precipitated silica.

In further accordance with this invention, the pneumatic tire is provided having said zoned built-in sealant layer positioned:

(A) between a tire innerliner rubber layer and tire rubber carcass, or (B) between two tire innerliner rubber layers, (and therefore covered by at least one tire innerliner rubber layer), or (C) on an exterior surface of a tire innerliner rubber layer.

In additional accordance with this invention, such pneumatic tire is provided wherein said zoned built-in sealant layer:

(A) extends from one shoulder of the tire to the other shoulder of the tire through the crown region of the tire;

(B) is positioned in at least one tire shoulder area region and extends into at least a portion of the adjoining tire sidewall portion of the tire, or (C) extends from sidewall-to-sidewall of the tire through the tire crown region.

In practice, the organoperoxide may be provided on a mineral carrier such as, for example calcium carbonate or a combination of calcium carbonate and calcium silicate.

In practice, examples of commercially available polyethylene glycols may be, for example, those such as Carbowax™ PEG 3350 as well as Carbowax™ PEG 8000 from the Dow Chemical Company with said Carbowax™ PEG 8000 reportedly having a weight average molecular weight in a range of about 7,000 to about 9,000 as determined by its NIR (near infrared) method 1B-ZMETH1.3. A further discussion concerning various polyalkylene oxide polymers, and particularly polyethylene glycols including said Carbowax PEG 8000 may be found, for example, although not intended to be limitive, in U.S. Pat. Nos. 6,322,811 and 4,082,703.

In practice, various clays may be used. Representative of such clays are, for example, kaolin clays. It is envisioned herein that a benefit of utilization of such clay is to provide a modified, or tempered, degree of reinforcement, as compared to the silica, for the sealant precursor composition to aid in its aforesaid processing and also to aid, in combination with the silica, in providing the aforesaid suitable storage modulus (G') of the resultant depolymerized butyl rubber-based sealant composition.

In practice, various synthetic amorphous precipitated silicas may be used. Representative of such precipitated silicas are, for example and not intended herein to be limitative, HiSil 546™ and HiSil 532™ from PPG Industries, Hubersil 4155™ from the J. M. Huber Company and Ultrasil™ VN2 and VN3 from the Degussa Company.

The optional various rubber processing oils are well known to those having skill in such art. For this invention, a rubber processing oil having a low aromaticity content is preferred, namely a rubber processing oil having an aromaticity content of less than about 15 weight percent. Such rubber processing oil may be composed of, for example, about 35 to about 45 weight percent naphthenic content, about 45 to about 55 weight percent paraffinic content and an aromatic content of less than about 15 weight percent (e.g. from about 10 to about 14 weight percent). It is considered herein that a representative of such preferred rubber processing oil is Tufflo 100™ from the Barton Solvent Company. The rubber processing oil, in relatively low concentrations, is seen herein to aid in mixing the ingredients for the sealant precursor composition and to aid in promoting the aforesaid processing of sealant precursor composition.

In practice, various colorants may be used where a sealant is desired having a color other than black. For example, such colorant may contain titanium dioxide. For example, the colorant of such sealant composition may preferably be composed of titanium dioxide where a white colored sealant layer is desired. Also, such colorant may contain, or be comprised, of titanium dioxide as a color brightener together with at least one non-black organic pigment and/or non-black inorganic pigment or dye.

Various optional colorants may be used to provide a non-black color to the sealant and sealant precursor composition, if a non-black color is desired. Representative of such colorants are, for example, yellow colored colorants as Diarylide Yellow™ pigment from PolyOne Corporation and Akrosperse E-6837™ yellow EPMB pigment masterbatch with an EPR (ethylene/propylene rubber) from the Akrochem Company. As discussed above, such yellow colored pigment may be used in combination and therefore together with titanium dioxide.

In practice, a pneumatic tire having a puncture sealing ability comprised of an assembly of components comprised of an outer circumferential (sulfur curable) rubber tread, (sulfur curable) rubber carcass supporting said tread and an inner (sulfur curable) halobutyl rubber-based tire innerliner layer, may be prepared by, for example:

(A) positioning a layer of said zoned sealant precursor strip, (exclusive of sulfur curative), between said tire innerliner rubber layer and said tire rubber carcass to form a tire assembly thereof, and (B) vulcanizing said tire assembly in a suitable mold at an elevated temperature, in a range of from, for example, about 130° C. to about 175° C., for a sufficient period of time to partially depolymerize said butyl rubber and thereby form a built-in sealant layer in said tire.

In practice, it is conventionally preferred that the butyl rubber and precipitated silica are blended in at least one sequential preparatory, or non-productive, mixing stage in the absence of the organoperoxide (together with at least one of the additional ingredients) followed by a final, or productive, mixing stage in which the organoperoxide are added.

Conventionally, the non-productive mixing stage(s) may be conducted, for example, by mixing the ingredients to a temperature, for example, in a range of from about 110 to about 150° C. and the subsequent productive mixing stage may be conducted, for example, by mixing the ingredients to a temperature in a range of from about 85 to about 100° C.

A significant aspect of the invention is having the unitary built-in sealant layer zoned into lateral zones and a central primary zone positioned between the lateral zones where the sealant composition has a higher low stain storage modulus (G') than the sealant composition of the central primary zone in order to retard a flow of the sealant composition toward the center of the tire during the running of the tire.

A further significant aspect of this invention is the at least partial depolymerization of the zoned butyl rubber based sealant precursor layer in situ in the tire during the vulcanization of the tire itself in a suitable mold at an elevated temperature via the dicumyl peroxide for the lateral zones of the sealant layer and the n-butyl-4,4-di(tert-butyl-peroxy) valerate for the central zone of the sealant layer, in the presence of reinforcing filler comprised of carbon black and/or precipitated silica, to create the built-in puncture sealant layer.

In practice, upon vulcanization of the tire assembly under conditions of elevated temperature, a major portion of the uncured butyl rubber composition is considered herein to be depolymerized in the presence of the organoperoxide compound to form a tacky material.

In practice, said tire innerliner is a halobutyl rubber-based layer which is typically a sulfur curative-containing halobutyl rubber composition of a halobutyl rubber such as for example chlorobutyl rubber or bromobutyl rubber.

Such tire halobutyl rubber-based innerliner layer may also contain one or more sulfur curable diene-based elastomers such as, for example, cis 1,4-polyisoprene natural rubber, cis 1,4-polybutadiene rubber and styrene/butadiene rubber, and their mixtures, or more preferably a combination of one or more of said halobutyl rubbers and said diene based elastomers.

In effect, the butyl rubber in the respective zones of the butyl rubber based composition sealant layer is depolymerized to a relatively low viscosity to form a tacky material which has tire puncture sealing properties. Thus, the zoned butyl rubber composition sealant precursor layer is transformed into a zoned puncture sealant layer during the curing of the tire. The at least partial depolymerization of the respective zones of the butyl rubber composition layer is effectuated by the presence of the aforesaid free radical-generating organoperoxide in the respective sealant layer zone.

In practice, the zones of butyl rubber compositions of the sealant precursor layer contain a sufficient amount of the free radical-generating organoperoxide to cause the butyl rubber of the respective zones sealant precursor layer to partially depolymerize, which may be, for example, in a range of from about 0.5 to about 15 phr of the active organoperoxide depending somewhat upon the time and temperature of the tire curing operation and the degree of depolymerization desired.

The various components of the respective zoned sealant layer can be prepared by mixing the respective ingredients together using convenient rubber mixing equipment, particularly an internal rubber mixer. The rubber compositions used for the zones of the sealant precursor layer typically have sufficient viscosity and unvulcanized tack to enable its incorporation into an unvulcanized tire without significantly departing from conventional tire building techniques.

In an exemplary method of this invention, the butyl rubber-based sealant precursor composition can be formed into a rubber strip composed of said central and lateral zones by manually laying, or applying, the respective central and lateral zone strips together, or by using conventional equipment such as a calender, extruder, gear pump or any combination thereof, and the zoned rubber strip assembled into the tire. In building the tires of this invention a rubber innerliner of a butyl rubber based (e.g. bromobutyl rubber) rubber composition is first applied to a building drum and then the strip of zoned butyl rubber based sealant precursor layer is applied to the layer of innerliner and thereafter the remainder of various carcass plies and layers of the tire assembly. The butyl rubber based zoned sealant precursor layer is thereby assembled into the unvulcanized tire assembly of components between an innerliner layer and tire carcass.

The thickness of the zoned sealant composition layer can vary greatly in an unvulcanized puncture sealant containing tire. Generally, the thickness of the sealant composition layer may range from about 0.13 cm (0.05 inches) to about 1.9 cm (0.75 inches). In passenger tires it is normally desired for the sealant composition layer to have a thickness of about 0.32 cm (0.125 inches) whereas for truck tires, a thickness of about 0.76 cm (0.3 inches) or greater might be desired.

After the unvulcanized pneumatic rubber tires of this invention are assembled they are vulcanized using a normal tire cure cycle. The tires of this invention can be cured over a wide temperature range. For example, passenger tires might be cured at a temperature ranging from about 130° C. to about 170° C. and truck tires might be cured at a temperature ranging from about 130° C. to about 170° C. Thus, a cure temperature may range, for example, from about 130° C. to about 170° C. and for a period of time (e.g. from about 10 to about 90 minutes or more depending somewhat upon the size of the tire and the degree of desired depolymerization of the butyl rubber as well as the thickness of the sealant layer itself) and sufficient to at least partially depolymerize said sealant precursor layer.

Accordingly, in one aspect of the invention, a self-sealing pneumatic rubber tire of this invention is envisioned wherein the tire has sidewalls, a supporting carcass, inextensible beads, an innerliner (air barrier layer), a zoned sealant layer, and an outer circumferential tread (tread portion). The individual sidewalls extend radially inward from the axial outer edges of the tread portion to join the respective inextensible beads. The supporting carcass acts as a supporting structure for the tread portion and sidewalls. The sealant layer is disposed between said supporting carcass and said innerliner. The outer circumferential tread is adapted to be ground contacting when the tire is in use.

BRIEF DESCRIPTION OF THE DRAWINGS

For a further understanding of the invention, drawings are provided in the form of FIGS. 1 through 5 (FIGS. 1 through 5).

THE DRAWINGS

Figure 1:
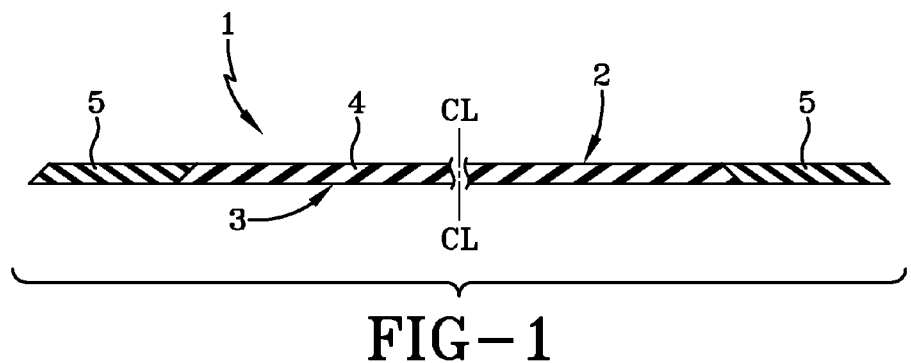
FIG. 1 as well as FIGS. 3 and 4, depict cross-sections of a zoned sealant precursor layer.

In FIG. 1, the zoned sealant precursor strip (1) is provided in a form of a butyl rubber based strip (1) divided into a central zone (4) and lateral outboard zones (5) with the center of the sealant precursor strip (1) being designated as (CL). The sealant precursor strip has a top side (2) and a bottom side (3).

The sealant composition of the central zone (4) contains butyl rubber and an organoperoxide comprised of n-butyl-4,4-di(tert-butyl-peroxy) valerate and the sealant composition of lateral zones (5) contain butyl rubber and a less active organoperoxide comprised of dicumyl peroxide.

Figure 2:
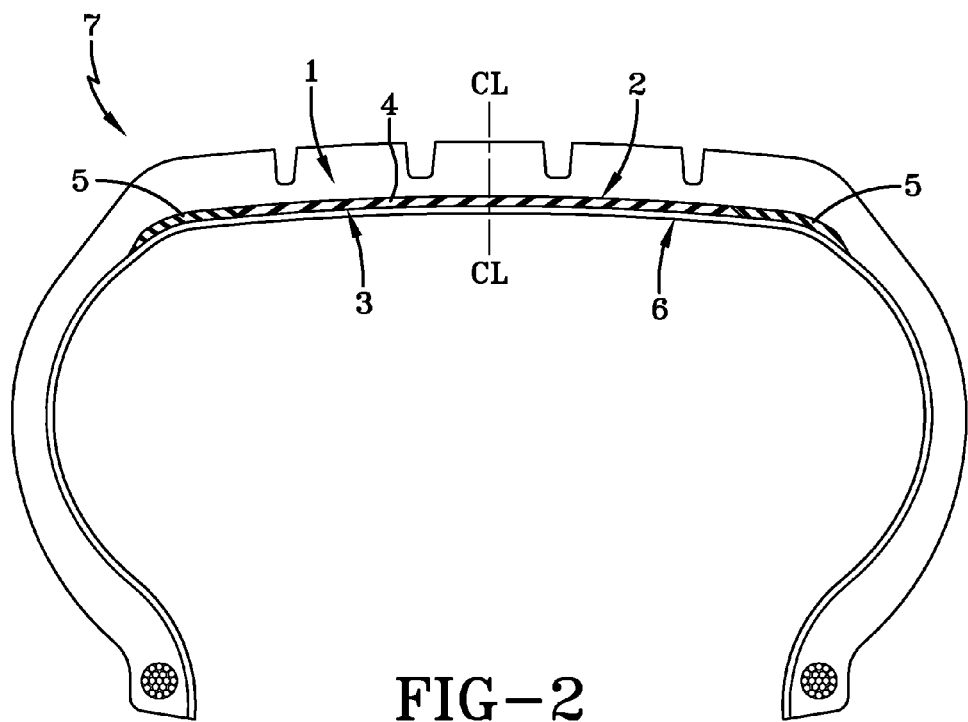
FIG. 2 and FIG. 5 depict a prospective tire cross-section which contains a built-in zoned sealant layer.

The zoned sealant precursor strip (1) is built into an assembly of rubber tire components and the assembly is cured in a suitable mold at an elevated temperature to form a tire (7) depicted in FIG. 2 having a built-in sealant layer (1) with said central zone (4) in the crown region of the tire and lateral outboard zones (5) in the shoulder region of the tire (7) created by in situ organoperoxide depolymerization of the butyl rubber in respective zones of the sealant precursor strip (1).

Figure 3:
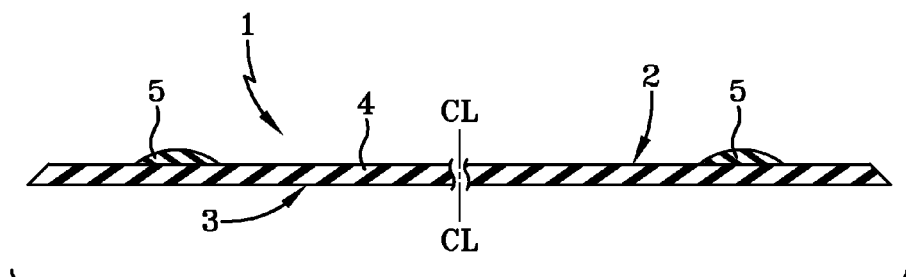

In FIG. 3, the zoned sealant precursor strip (1) is provided in a form of a butyl rubber based strip (1) divided into a central zone (4) which extends throughout the width of the sealant precursor strip (1) and lateral zones (5) which are positioned on the top surface (2) of the central zone (4) and spaced apart from the center line (CL) of the sealant precursor strip (1) and its peripheral edges.

The sealant composition of the central zone (4) contains butyl rubber and an organoperoxide comprised of n-butyl-4,4-di(tert-butyl-peroxy) valerate and the sealant composition of lateral zones (5) contain butyl rubber and a less active organoperoxide comprised of dicumyl peroxide.

Figure 4:
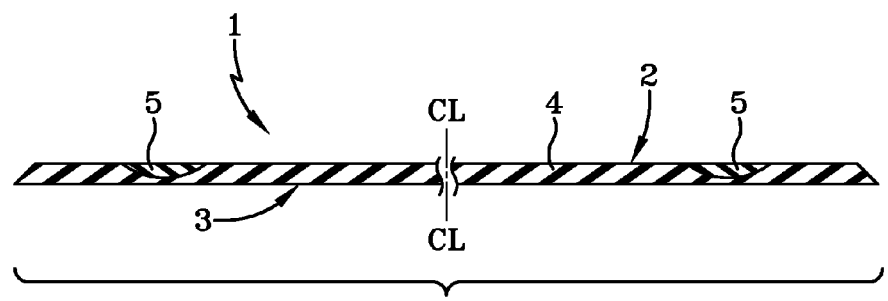

FIG. 4 is similar to FIG. 3 except that, in FIG. 4, the sealant precursor for the lateral zones (5) is applied to depressions in the central zone (4).

Figure 5:
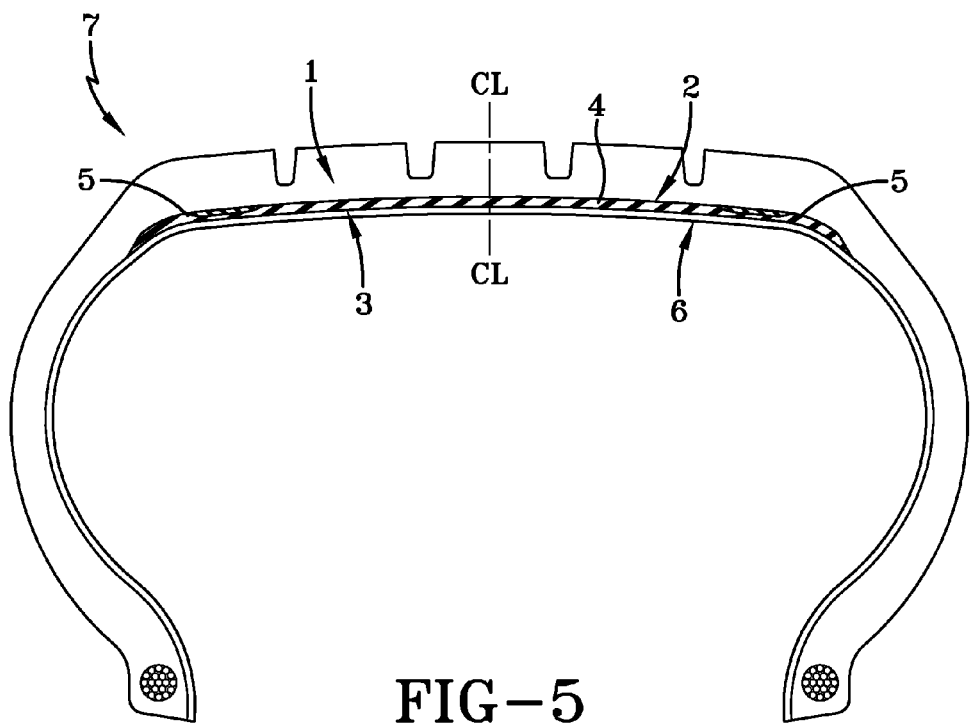

The zoned sealant precursor strip (1) is built into an assembly of rubber tire components and the assembly is cured in a suitable mold at an elevated temperature to form a tire (7) depicted in FIG. 5 having a built-in sealant layer (1) with said central zone (4) in the crown region of the tire and lateral zones (5) in the shoulder region of the tire (7) tire created by in situ organoperoxide depolymerization of the butyl rubber in respective zones of the sealant precursor strip (1).

The following examples are provided to aid in understanding the invention. They are not to be regarded as limiting the scope of the invention or the manner in which it can be practiced. The parts and percentages are given by weight unless otherwise indicated.

EXAMPLE I

Illustrative butyl rubber-based sealant precursor compositions are prepared by mixing ingredients in an internal mixer. The ingredients are mixed in a first, non-productive, mixing stage without the organoperoxide followed by a second, productive, mixing stage in which dicumyl peroxide is added subsequent to addition of a precipitated silica. The ingredients are illustrated in the following Table 1.

Rubber Sample A represents a sealant precursor rubber composition using a more active organoperoxide "A".

Samples B and C represent a sealant precursor rubber composition using a less active organoperoxide "B", namely a dicumyl peroxide.

For Sample B, less active organoperoxide "B" is used.

For Sample C, the less active organoperoxide "B" is used in combination with a magnesium oxide modifier.

For Sample D, the less active organoperoxide "B" is used in combination with a calcium carbonate co-modifier.

The parts and percentages are by weight unless otherwise indicated.

TABLE 1

| Material | Central Sealant Zone Sample A | Lateral Sealant Zone Sample B | Alternate Lateral Sealant Zone Sample C |
|---|---|---|---|
| First (Non-Productive) Mixing Step | | | |
| Butyl rubber[1] | 100 | 100 | 100 |
| Precipitated, amorphous silica[2] | 20 | 20 | 20 |
| Clay[3] | 10 | 10 | 10 |
| Polyethylene glycol[4] | 0.25 | 0.25 | 0.25 |
| Rubber processing oil[5] | 3 | 3 | 3 |
| Colorant as a yellow colored pigment masterbatch[6] | 1 | 1 | 1 |
| Second (Productive) Mixing Step | | | |
| More active organoperoxide "A"[7] | 12 | 0 | 0 |
| Less active organoperoxide "B"[8] | 0 | 12 | 15 |

TABLE 1-continued

| Material | Central Sealant Zone Sample A | Lateral Sealant Zone Sample B | Alternate Lateral Sealant Zone Sample C |
|---|---|---|---|
| Average storage modulus G' 5%, kPa[9] | 20 | 59 | 43 |

[1]Butyl rubber as Butyl 068 ™ from the ExxonMobil Company, having a Mooney (1 + 8) viscosity at 125° C. of about 51, as a copolymer of isobutylene and isoprene having less than one percent units derived from isoprene
[2]Amorphous precipitated silica as Hubersil 4155 from J. M. Huber Company
[3]Kaolin clay as RC-32 ™ from Thiele Kaolin Company
[4]Polyethylene glycol having a weight average molecular weight of about 8,000 (understood to be about plus or minus about 1,000) as Carbowax PEG 8000 ™ from the Dow Chemical Company
[5]Rubber processing oil as Tufflo 100 ™ from Barton Solvents Company reportedly a naphthenic, paraffinic rubber processing oil having a maximum aromatic content of less than 15 weight percent
[6]A yellow colored organic/inorganic pigment as Akrosperse E-6837 ™ yellow EPMB pigment masterbatch with EPR (ethylene/propylene rubber), in a 50/50 weight ratio of yellow pigment to EPR, from the Akrochem Company and reported in Table 1 as the composite.
[7]Organoperoxide "A" as a composite of organoperoxide as a combination of n-butyl-4,4-di (tert-butyl-peroxy) valerate and a mineral carrier as a combination of calcium carbonate and calcium silicate containing about 40 weight percent of the organoperoxide (thus reported herein as being 40 percent active) as Link Cup NBV 40C ™ from the Geo Specialty Chemical Company and reported in Table 1 as the composite.
[8]Organoperoxide "B" as a composite of organoperoxide as a combination of dicumyl peroxide and a mineral carrier as a combination of calcium carbonate and calcium silicate containing about 40 weight percent of the dicumyl peroxide (thus reported herein as being 40 percent active) as Luperox DCP40P ™ from the Arkema Company and reported in Table 1 as the composite.
[9]The storage modulus (G') for the sealant composition after organoperoxide depolymerization of the butyl rubber in the sealant precursor composition in terms of their G' at a 5 percent dynamic strain at 100° C. and 1 Hertz.

The Samples were heated to a temperature of about 150° C. for about 30 minutes to at last partially depolymerize the butyl rubber in the presence of the organoperoxide.

From Table 1 it can be seen that the average storage modulus (G') for the lateral sealant zone for Sample B (59 kPa) and Sample C (43 kPa) which used the less active organoperoxide "B", namely the dicumyl peroxide composite, was significantly higher (by at least 20 kPa) than the storage modulus (G') for the central sealant zone Sample A (20 kPa) which used the more active organoperoxide "A", thereby presenting a greater resistance to flow for the sealant composition of the lateral sealant zone.

The aforesaid storage modulus (G') physical properties for the sealant compositions are determined at a 5 percent dynamic strain at 1 hertz at 100° C. by an aforesaid RPA (Rubber Process Analyzer) instrument. The measurement is made prior to, and after, a 30 minute heat at 150° C. to yield a delta G' (at a 5 percent dynamic strain) for the depolymerization reaction. The Rubber Process Analyzer instrument used was RPA 2000™ instrument by Alpha Technologies.

EXAMPLE II

A tubeless pneumatic steel belted medium radial truck tire is prepared by first applying a standard butyl rubber innerliner layer (e.g. bromobutyl rubber composition) to a standard building drum. Then a zoned layer of butyl rubber-based sealant precursor similar to FIG. 1 composed of lateral zones comprised of the composition of Sample B of Example I and a central zone comprised of the composition of Sample A of Example I having a thickness of about 0.76 cm (about 0.3 inches) is applied to the innerliner layer on the building drum followed by application of diene rubber based carcass components, including the carcass plies, tread, sidewalls and beads, to form the uncured, or green, tire construction, or assembly, which contains the zoned butyl rubber-based sealant precursor layer.

The green tire is cured in a suitable tire curing mold at an elevated temperature to form a tire with a built-in sealant layer similar to FIG. 2 having a thickness of about 0.38 cm (about 0.15 inches) formed by a partial (substantial) depolymerization of the zoned butyl rubber-based sealant precursor layer by the respective organoperoxides an elevated tire cure temperature with the sealant composition of the lateral zones having a storage modulus (G') at least 20 kPa greater than the sealant composition of the central zone and thereby presenting a greater dimensional stability and resistance to flow for the lateral zones.

While certain representative embodiments and details have been shown for the purpose of illustrating the invention, it will be apparent to those skilled in this art that various changes and modifications may be made therein without departing from the spirit or scope of the invention.

What is claimed is:

1. A process of preparing a tire having a built-in sealant layer which comprises building a zoned butyl rubber based sealant strip precursor into a green, unvulcanized, tire assembly curing the assembly in a suitable mold at an elevated temperature, and to at least partially depolymerize said butyl rubber of said sealant precursor zones in the presence of organoperoxides to form a tire containing a zoned built-in sealant layer;

wherein said zoned built-in sealant precursor strip is comprised of a central zone and outboard lateral zones and wherein either (A) said central zone is positioned between said outboard lateral zones, wherein said outboard lateral zones are individually positioned in a spaced apart relationship to each other on each side of said central zone and at the peripheral edges of said sealant precursor strip;

wherein said central zone comprises:

about 50 to about 70 percent of the width of said sealant precursor strip and said lateral zones correspondingly comprise a total of from about 30 to about 50 percent of the width of the sealant precursor strip where each of said outboard lateral zones are of substantially equal widths and each individually thereby occupy from about 15 about 25 percent of the width of the sealant precursor strip; or (B) said central zone extends throughout the length and width of the sealant precursor strip and said lateral zones comprise a total of about 10 to about 20 percent of the width of the sealant precursor strip where each of the lateral zones are of substantially equal widths and each individually thereby occupy from about 5 to about 10 percent of the width of the sealant precursor strip;

wherein the compositions of said sealant precursor strip zones are comprised of:
  (1) butyl rubber,
  (2) organoperoxide,
  (3) reinforcing filler comprised of precipitated silica and colorant having a color other than black, and
  (4) optionally clay;

wherein the central sealant zone has a storage modulus (G') physical property, at a 5 percent dynamic strain at 100° C. and 1 hertz in a range of from about 10 to about 60 kPa and the sealant composition for the lateral sealant zones has a storage modulus (G') physical property, at a 5 percent dynamic strain at 100° C. and 1 hertz in a range of from about 20 to about 60 kPa and at least 20 kPa higher than the sealant composition of said central sealant zone;

wherein the organoperoxide of said sealant precursor of said lateral zones is dicumyl peroxide and the organoperoxide of the sealant precursor of said central zone is comprised of n-butyl-4,4-di(tert-butyl-peroxy) valerate;

wherein said zoned sealant layer is positioned between a tire innerliner rubber layer and tire rubber carcass, or between two tire innerliner rubber layers, or on an exterior surface of a tire innerliner rubber layer.

2. A pneumatic tire which contains a built-in zoned circumferential sealant layer comprised of a central zone and outboard lateral zones which extend throughout the circumferential length of the sealant layer in a parallel relationship to each other of a configuration which comprises:

(A) said central zone positioned between said outboard lateral zones wherein said outboard lateral zones are individually positioned in a spaced apart relationship to each other on each side of said central zone and at the peripheral edges of said sealant layer;

wherein said central zone comprises from about 50 to about 70 percent of the width of said sealant layer and said lateral zones correspondingly comprise a total of from about 30 to about 50 percent of the width of the sealant layer where each of said outboard lateral zones are of substantially equal widths and each individually thereby occupy from about 15 to about 25 percent of the width of the sealant layer; or (B) wherein said central zone extends throughout the length and width of the sealant layer and said outboard lateral zones comprise a total of from about 10 to about 20 percent of the width of the sealant layer where each of the lateral zones are of substantially equal widths and each individually thereby occupy from about 5 to about 10 percent of the width of the sealant layer;

wherein the compositions of the zones of said sealant layer are comprised of organoperoxide depolymerized butyl rubber and (1) reinforcing filler comprised of precipitated silica and colorant having a color other than black and (2) optionally clay, (3) optionally from zero to about 20 phr of rubber processing oil having a maximum aromatic content of about 15 weight percent, wherein the organoperoxide for the depolymerization of the butyl rubber of said central zone is comprised of n-butyl-4,4-di(tert-butyl-peroxy) valerate and the organoperoxide for the depolymerization of said lateral zones is comprised of dicumyl peroxide, wherein said precipitated silica is a precipitated silica treated with polyethylene glycol having a weight average molecular weight in a range of from about 2,000 to about 15,000, and wherein the central sealant zone has a storage modulus (G') physical property, at a 5 percent dynamic strain at 100° C. and 1 hertz in a range of from about 10 to about 60 kPa and the sealant composition for the lateral sealant zones has a storage modulus (G') physical property, at a 5 percent dynamic strain at 100° C. and 1 hertz in a range of from about 20 to about 60 kPa and at least 20 kPa higher than the sealant composition of said central sealant zone, and wherein said zoned sealant layer is positioned:

between a tire inner liner rubber layer and tire rubber carcass, or between two tire innerliner rubber layers, or on an exterior surface of a tire innerliner rubber layer.

3. The pneumatic tire of claim 2 wherein said zoned sealant layer is positioned between a tire innerliner rubber layer and tire rubber carcass.

4. The process of claim 1 wherein said zoned sealant layer is positioned between a tire innerliner rubber layer and tire rubber carcass.

5. The process of claim 1 wherein said precipitated silica is a precipitated silica treated with polyethylene glycol having a weight average molecular weight in a range of from about 2,000 to about 15,000.

6. A built-in sealant-containing tire prepared by the process of claim 1.

7. A tire prepared by the process of claim 5.

* * * * *